United States Patent [19]

Rogus

[11] Patent Number: 4,777,669
[45] Date of Patent: Oct. 18, 1988

[54] FLUSH VALVE/FLUSH TUBE CONNECTION

[75] Inventor: Raymond Rogus, Chicago, Ill.

[73] Assignee: Sloan Valve Company, Franklin Park, Ill.

[21] Appl. No.: 49,283

[22] Filed: May 13, 1987

[51] Int. Cl.⁴ .............................................. E03C 1/00
[52] U.S. Cl. ........................................ 4/191; 285/340; 285/348; 285/354
[58] Field of Search ...................... 4/191, 252 R, 300; 285/104, 105, 113, 340, 348, 354, 12

[56] References Cited

U.S. PATENT DOCUMENTS

| | | | |
|---|---|---|---|
| 1,928,821 | 10/1933 | Santiago | 285/105 |
| 3,058,760 | 10/1962 | Bankowski | 285/340 |
| 3,273,919 | 9/1966 | Billeter et al. | 285/340 |
| 3,540,065 | 11/1970 | Gidner et al. | 4/252 R |
| 3,583,003 | 6/1971 | Thompson | 4/191 |
| 3,879,065 | 4/1975 | Kobayashi | 285/340 |
| 3,963,298 | 6/1976 | Seiler | 285/105 |
| 4,084,843 | 4/1978 | Gassert | 285/105 |
| 4,146,254 | 3/1979 | Turner et al. | 285/105 |
| 4,516,278 | 5/1985 | Lamond | 4/191 |
| 4,593,943 | 6/1986 | Hama et al. | 285/105 |

Primary Examiner—Henry J. Recla
Assistant Examiner—Linda J. Sholl
Attorney, Agent, or Firm—Kinzer, Plyer, Dorn, McEachran & Jambor

[57] ABSTRACT

A connection between the outlet of a flush valve and a flush tube includes an outlet fitting for the flush valve having an exterior thread thereon and a flush tube which extends within the outlet fitting. A coupling nut having an interior threaded area for attachment to the fitting also has an inwardly-directed annular shoulder which extends closely adjacent the flush tube and with the end of the fitting, defines an annular chamber. Positioned within the annular chamber is an annular elastomeric gasket in contact with an end of the fitting and in peripheral contact with the flush tube. A back-up ring is positioned within the chamber for circumferential contact with the gasket and a clip ring is positioned within the chamber between the back-up ring and the coupling nut shoulder and is adapted for surface penetration engagement with the exterior of the flush tube. As the interiorly threaded coupling nut is advanced on the exteriorly threaded fitting, the size of the chamber is reduced and the gasket and back-up ring move the clip ring into surface penetration of the flush tube to secure the flush tube to the fitting. The gasket is distorted into sealing contact with the flush tube, back-up ring, fitting and the interior of the coupling nut.

4 Claims, 1 Drawing Sheet

FLUSH VALVE/FLUSH TUBE CONNECTION

SUMMARY OF THE INVENTION

The present invention relates to flush valves or flushometers for use with plumbing fixtures such as water closets and urinals and has particular application to the inlet and outlet connections therefor.

One purpose of the present invention is an improved connection between the outlet of a flush valve and a flush tube which is simple in construction and reliable.

Another purpose is a plumbing connection of the type described which remains tight and leakproof over a long period of time, even with the intermittent application of water pressure occasioned during normal use.

Another purpose is a plumbing connection of the type described utilizing a clip ring which is urged into surface penetration with the flush tube as the fitting is tightened, with distortion of the sealing gasket providing the energy required to force the clip ring into such engagement.

Another purpose is a plumbing connection of the type described in which the sealing gasket is distorted into contact with multiple elements and which sealing gasket, due to the distortion force applied during assembly of the connection, causes the clip ring to penetrate the exterior surface of the flush tube to anchor the connection upon the flush tube.

Another purpose is an improved plumbing connection between a plumbing fitting, such as a flush valve, and a tube or pipe used as a part of a flush valve installation.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present application is concerned with the connection between the outlet of a flush valve or flushometer, as it is currently termed, and the flush tube which connects the flush valve to a plumbing fixture such as a water closet or urinal. The invention also has application to other fitting/tube connections in a flush valve installation such as between the flush valve inlet and the control valve and between the vacuum breaker and relating plumbing fittings. It is essential that such connections be watertight and that they remain watertight over a long period of time, particularly when the connection is made behind the wall of the washroom where it is not visible or readily accessible for repair.

Whenever a flush valve is operated, there is a sudden surge of water through the flush tube and related pipes that connect with the plumbing fixture and unless the connections are firmly anchored, they will in time work loose. At present, one common way to anchor the flush tube to the flush valve is to score the exterior surface of the flush tube in the area where the connection will be made so that the sealing gasket can itself anchor to the flush tube. In practice, this has not proved to be totally satisfactory.

The connection of the present invention will be described in relation to the flush valve outlet and the flush tube, although it should be understood that the same arrangement of parts could be used elsewhere in a flush valve installation. A split ring or clip ring is utilized to anchor the flush tube to the flush valve and this ring is driven into surface penetration with the flush tube as the sealing gasket is compressed and distorted when the connection is assembled. The invention will be described in connection with flush valves of the type manufactured by Sloan Valve Company of Franklin Park, Il., but the invention has application to any type of flush valve in which there is a required connection between the valve and the flush tube which leads to the toilet fixture.

Figure 1:
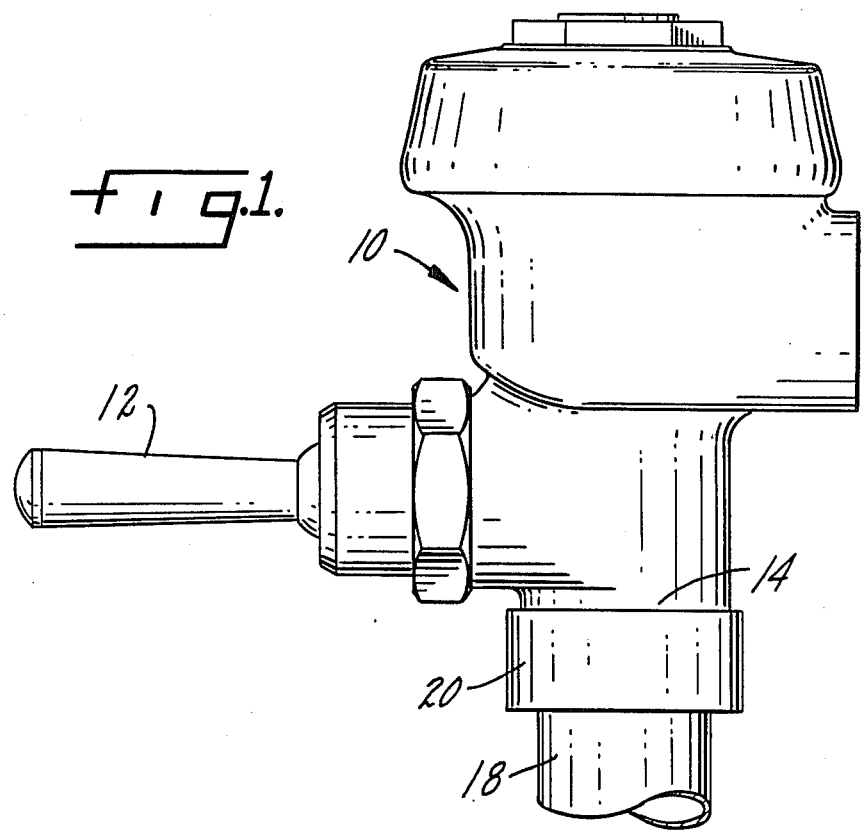
FIG. 1 is a side view of a flush valve illustrating the connection between the flush valve outlet fitting and the flush tube.
Figure 2:
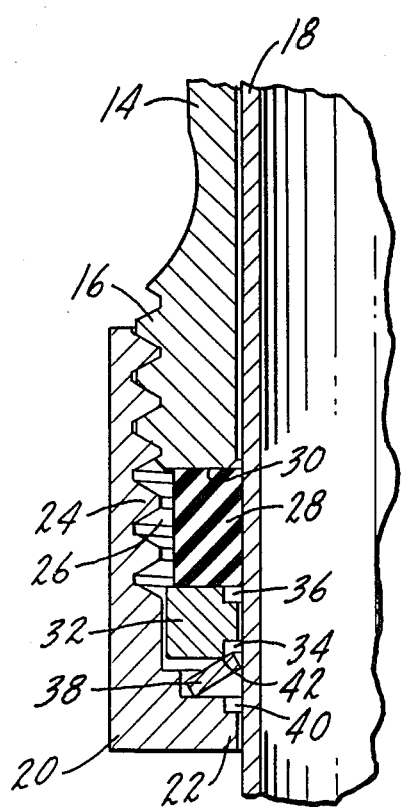
FIG. 2 is an enlarged section illustrating the connection between the flush valve outlet fitting and the flush tube.
Figure 3:
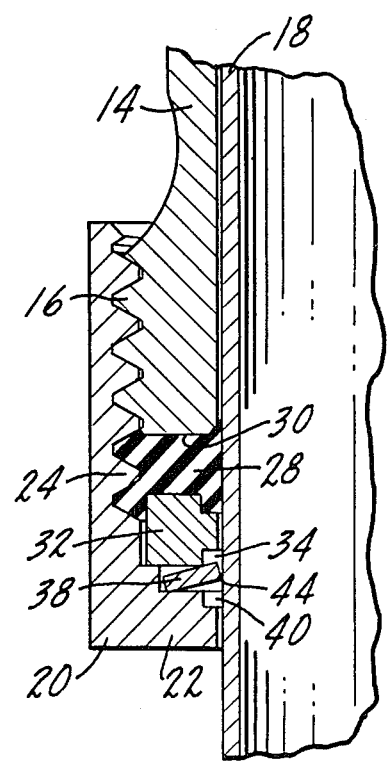
FIG. 3 is a side view, similar to FIG. 2, showing the connection in the loaded or tightened position.

In FIG. 1, a typical flush valve of the type manufactured by Sloan Valve Company is illustrated generally at 10, with the interior mechanism of the flush valve not being illustrated, as such is well known in the art, and may be found, for example, in U.S. Pat. No. 4,327,891. The handle for operating the flush valve is indicated at 12 and the outlet is indicated at 14. The outlet which is termed the "fitting" has an exterior threaded area 16 (FIGS. 2 and 3). A flush tube 18 is positioned within outlet fitting 14, with the flush tube conventionally having its opposite end connected to a plumbing fixture such as a water closet or urinal.

As illustrated in more detail in FIGS. 2 and 3, and looking first at the unloaded or untightened position of the connection in FIG. 2, there is a coupling nut 20 which has an inwardly-directed annular shoulder 22 at the end away from the fitting and has an interiorly threaded area 24 which is formed and adapted to mate with the threaded area 16 on outlet fitting 14. Thus, the coupling nut is used to make the connection between the outlet of the flush valve and the flush tube.

When nut 20 is assembled onto fitting 14 the two elements define a chamber which circumferentially extends about the flush tube and is indicated generally at 26. Positioned within chamber 26 is an elastomeric or rubber sealing gasket 28 which is in contact with end surface 30 of fitting 14. Adjacent gasket 28 is a back-up ring 32 which may be metal or plastic, but is rigid in contrast to the distortable material of the gasket. Back-up ring 32 has an annular groove 34 at the interior surface thereof on one side and a similar annular groove 36 at the interior surface thereof on the opposite side. Adjacent back-up ring 32 is a clip ring 38 which is used to attach or secure the flush tube to the fitting. Ring 38 may be of spring steel and conventionally will be a split ring for ease in assembly onto the flush tube. A split ring is also advantageous in that it requires less force to penetrate the flush tube. The interior surface of annular shoulder 22 of coupling nut 20 may have a groove 40 which is similar to grooves 34 and 36 on the interior surface of back-up ring 32.

FIG. 2 illustrates the connection prior to tightening coupling nut 20. All of the elements are illustrated in their free undistorted and untightened position. FIG. 3 illustrates the connection after it has been fully tightened. As coupling nut 20 is advanced onto the threads of fitting 14, rubber gasket 28 will be distorted as the size of chamber 26 decreases. This distortion will provide movement of the back-up ring toward clip ring 38 with the result that the clip ring will pivot about edge 42 formed by groove 34 so that the inner edge or surface of the clip ring, indicated at 44, will be driven into biting engagement or into surface penetration with the exterior of the flush tube. The energy or force which causes the clip ring to penetrate the surface of the flush tube is provided by the distorting rubber gasket as such distortion is brought about by a decrease in size of chamber 26. The back-up ring is driven into the clip ring and the rubber gasket distorts not only into groove 36 of the back-up ring, but into the threads of the coupling nut. The rubber gasket will firmly engage and seal with the exterior of the flush tube and will tend to move into any area which is open and directly adjacent the gasket as it is distorted by assembly of the coupling nut. When the connection is fully made, the gasket will be in sealing engagement with end 30 of the fitting, threads 24 of the coupling nut, one side of and groove 36 of the back-up ring and the exterior of the flush tube. The seal is complete and the connection is anchored onto the exterior of the flush tube as edge 44 of clip ring 38 will have been driven into surface penetration with the flush tube.

As it is possible in any assembled connection of this type for the clip ring to be put in backwards, groove 40, similar to groove 34 on the back-up ring, also defines a pivot point for the clip ring. Thus, if ring 38 should be assembled backwards, the ring will pivot about the edge defined by groove 40 of shoulder 22 and the back-up ring as the coupling nut is tightened onto the fitting. The connection will be the same in either case, as what is required is a means to urge the clip ring into penetration with the surface of the flush tube, under force provided by the distorting rubber of the gasket.

The connection is particularly advantageous in that it is simple, foolproof in terms of assembly, and reliable. The flush tube is anchored by clip ring 38 to the fitting of flush valve and this connection will remain through years of service.

U.S. Pat. No. 3,273,919 shows a similar connection between the flush valve inlet and a control valve.

Whereas the preferred form of the invention has been shown and described herein, it should be realized that there may be many modifications, substitutions and alterations thereto.

The embodiments of the invention in which an exclusive property or privilege is claimed are defined as follows:

1. In a plumbing connection for use in a flush valve installation, a tube, a fitting extending from a flush valve and having an exterior thread thereon, said tube extending with said fitting, a coupling nut having an interior threaded area for use in attaching the nut to the fitting, the coupling nut having an inwardly-directed annular shoulder which extends closely adjacent the tube and defines, with an end of the fitting, an annular chamber, said annular shoulder within said annular chamber and adjacent said tube defining a first annular pivot location and a second annular pivot location radially spaced from said first pivot location, an annular elastomeric gasket positioned within said chamber for contact with the end of the fitting and for peripheral contact with the tube, a back-up ring positioned within said chamber adjacent said tube and on one side thereof being in circumferential contact with said gasket, and on the opposite side thereof defining a third annular pivot location adjacent said tube and a fourth annular pivot location radially spaced from said third pivot location, and an annular bevelled clip ring positioned within said chamber between said back-up ring and coupling nut shoulder and having an inner annular edge arranged for surface penetration engagement with the exterior of said tube and an outer annular edge arranged to contact either said second or fourth annular pivot locations, said clip ring further having an intermediate annular portion arranged to contact either said first or third annular pivot locations, whereby, depending on the direction that the clip ring is inserted into said chamber, advancement of the interiorly threaded coupling nut on the exteriorly threaded fitting reduces the size of said chamber causing said gasket and back-up ring to pivot said clip ring about first and fourth annular pivot locations or said second and third annular pivot locations and forces said inner edge into surface penetration of said tube to secure the tube to the fitting, and causing distortion of said gasket into sealing contact with the exterior of said tube, a circumferential surface of said back-up ring, the interior of the threaded coupling nut and the end of said fitting.

2. The connection of claim 1 further characterized in that said back-up ring has an interior annular groove adjacent said clip ring, an edge of which groove defines said third pivot location about which said clip ring turns as it is urged into the surface of said tube.

3. The connection of claim 2 further characterized in that said back-up ring has a second interior annular groove adjacent said elastomeric gasket, with said elastomeric gasket distorting into said second annular groove as the chamber is reduced in size due to the advancement of said coupling nut on said threaded fitting.

4. The connection of claim 1 further characterized in that said coupling nut annular shoulder has an interior annular groove adjacent said clip ring, an edge of which groove defines said first pivot location about which said clip ring may turn as it is urged into the surface of said tube.

* * * * *